UNITED STATES PATENT OFFICE.

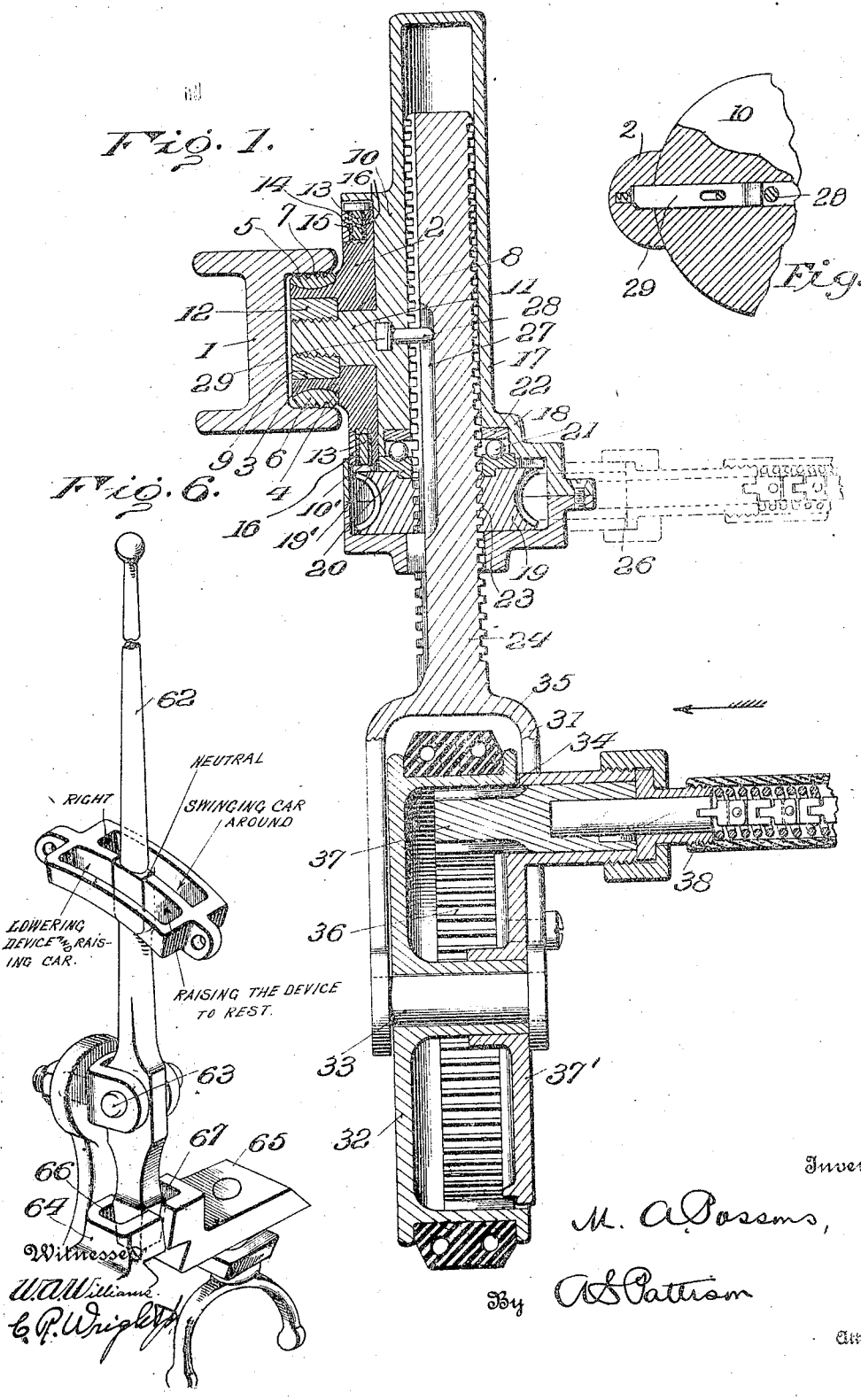

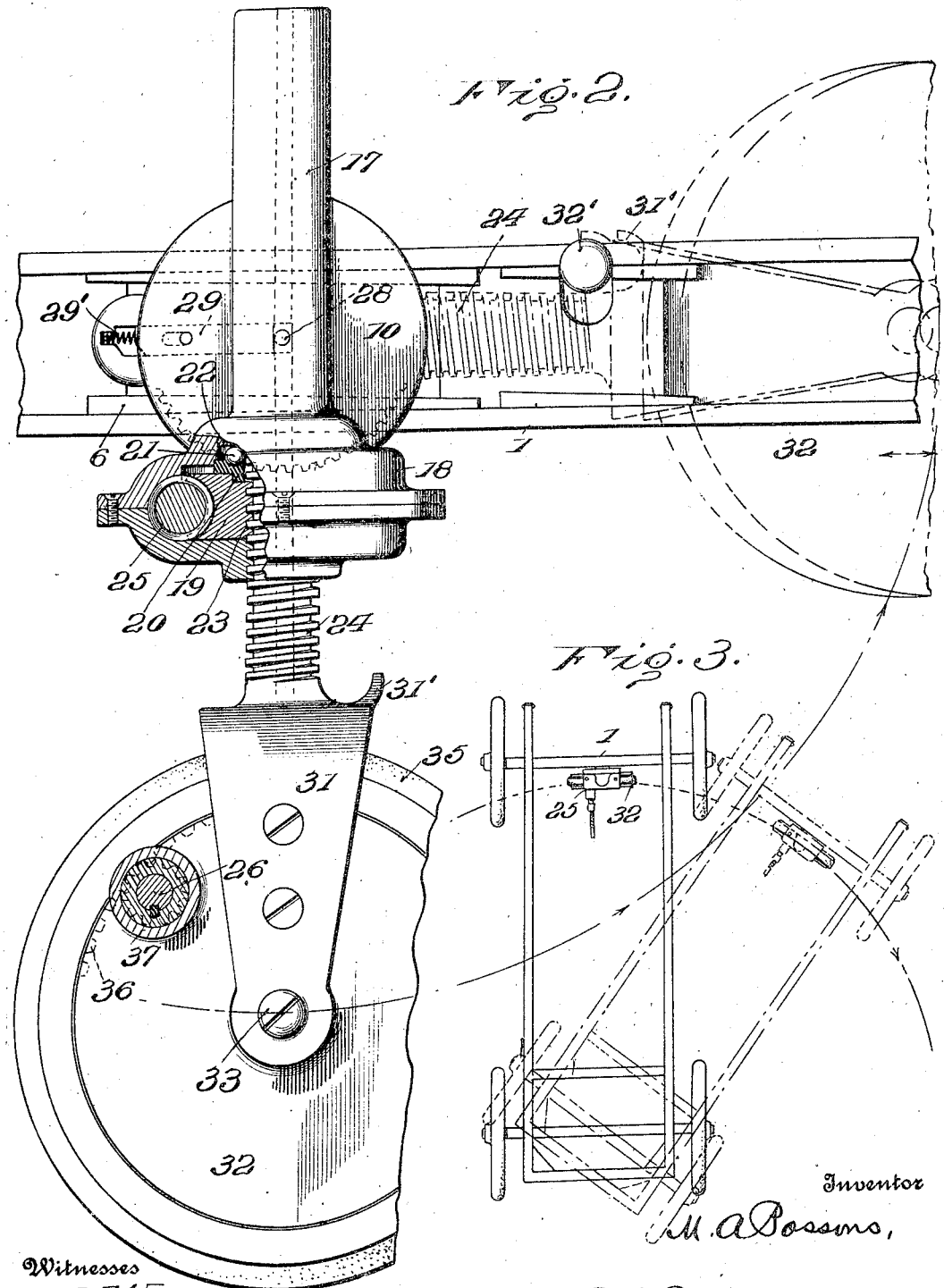

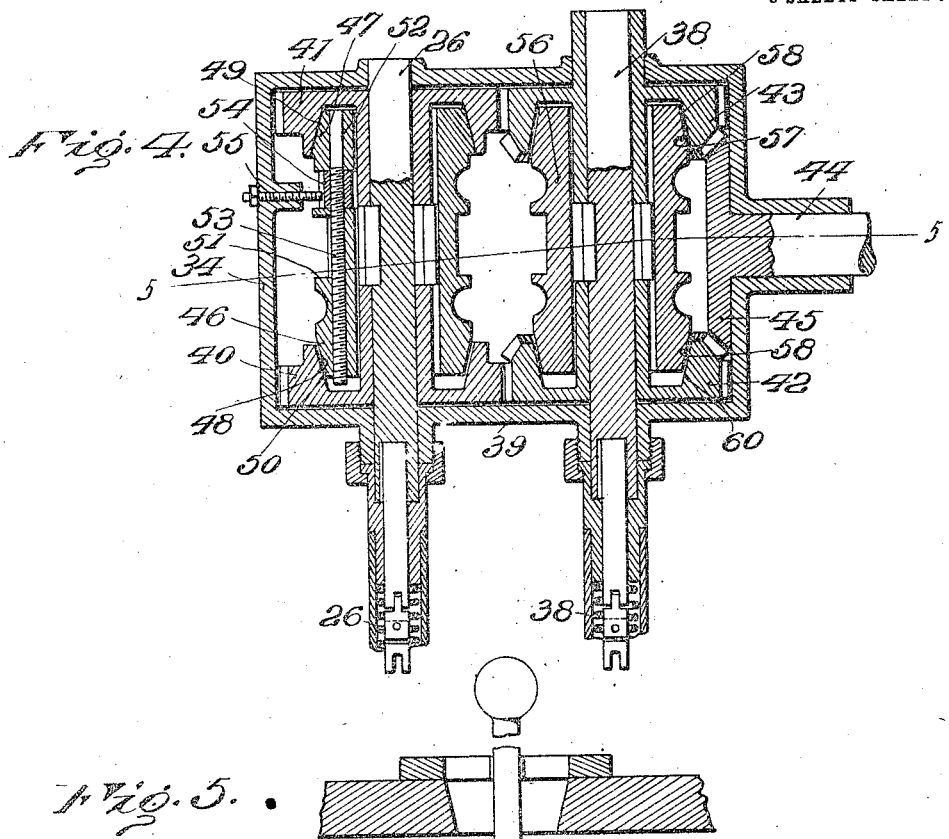
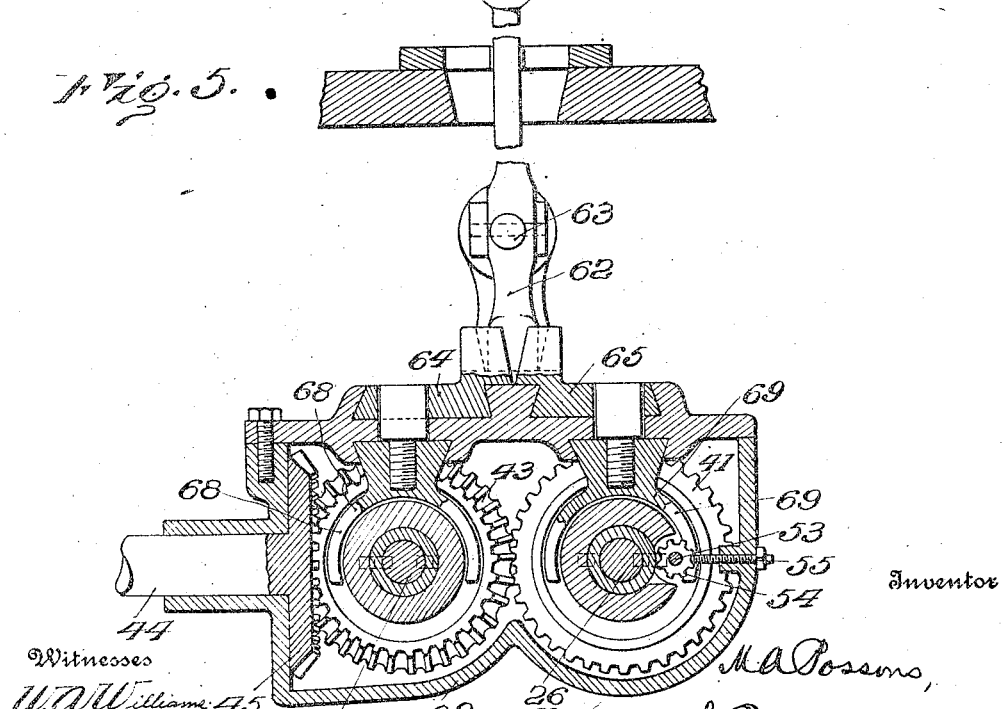

MINARD A. POSSONS, OF CLEVELAND, OHIO.

AUTOMATIC TURNING DEVICE.

1,121,395.

Specification of Letters Patent.   Patented Dec. 15, 1914.

Application filed July 14, 1913. Serial No. 779,032.

*To all whom it may concern:*

Be it known that I, MINARD A. POSSONS, a citizen of the United States, residing at Cleveland, in the county of Cuyahoga and State of Ohio, have invented certain new and useful Improvements in Automatic Turning Devices, of which the following is a specification, reference being had therein to the accompanying drawing.

My invention relates to improvements in automobile turning devices.

The object of my invention is to provide an attachment for automobiles, whereby the front wheels may be raised from the ground and the front of the machine swung around the rear wheels forming the pivot upon which the machine is turned, and whereby the automobile can be turned around in a very small space.

Another object of my invention is to provide a device of this character, whereby the turning means is in full control of the operator of the automobile, and at the same time providing automatic means for throwing the raising means downwardly and upwardly and raising the front wheel off the ground the necessary distance, while the driving or turning means is in full control of the operator.

A still further object of my invention is to provide a simple, cheap and effective device of this character and having certain details of construction and operation hereinmore fully set forth.

In the accompanying drawings—Figure 1 is a vertical longitudinal sectional view showing the front axle in cross-section and showing my improved turning device attached thereto. Fig. 2 is a side view of Fig. 1, looking in the direction of the arrow and shown partly in section. Fig. 3 is a diagrammatical view showing the turning of the automobile. Fig. 4 is a vertical sectional view of the transmission for driving the raising and lowering shaft and the turning shaft, and showing the automatic reversing and stopping mechanism for the raising and lowering the turning wheel. Fig. 5 is a transverse sectional view taken on the line 5—5 of Fig. 4. Fig. 6 is a perspective view of the gear controlling lever. Fig. 7 is a vertical sectional view showing the latch for locking the turning wheel in its lowered position.

Referring now to the drawings, 1 represents the front axle of an automobile which is of the usual I-beam form and to which my improved turning device is attached.

2 represents a plate having at its center the inwardly extending annular portion 3, which enters the channel of the axle 1. This portion 3, on its upper and lower faces 4, is concaved and into which fits the wedges 5 and 6, having their outer faces provided with teeth 7, which are adapted to bite into the metal of the axle and rigidly lock the plate to the same. The teeth, as shown face outwardly so as to prevent the outward movement of the plate and also preventing any longitudinal movement of the plate in respect to the axle. The plate 2 is of a circular form and is provided with an opening 8 therethrough, which communicates with the enlarged opening 9 in the annular portion 3. Surrounding the plate 2, is a housing 10, which is provided with an inwardly extending stud 11, entering the opening 9, and has a nut 12 screwed thereon within the enlarged opening 9, whereby the housing 10 is free to rotate on the plate. The housing 10 has a gear 10' therein having an inwardly extending annular flange 13, fitting between leather washers 14 and 15, carried by the plate 2, and said washers held against the flange by means of the ring 16, screwed upon the plate 2, whereby the frictional contact between the same may be varied as desired.

The housing 10 carries at one side the vertically disposed elongated hollow portion 17, carrying at its lower end the enlarged annular housing 18, in which is arranged the horizontally disposed worm-gear 19. This worm bears against a plate 20 forming a ball-race for the ball bearings 21, and said balls also bearing against the ring 22 in the housing 18, whereby the upward thrust of the worm gear 19 is taken up, yet allowing of the free rotation thereof. The upper face of the worm gear is provided with teeth 19', which engage the gear 10', whereby the rotation of the gear causes the housing to rotate, but when the same is engaged by the lug 32, the flange 13 slips between the washers and will allow the continued rotation of the worm gear. The said worm is provided with a central threaded opening 23 through which passes the screw-rod 24, and which extends upwardly within the housing 17. The housing 18, at one edge, is enlarged and in which is rotatably mounted the worm 25, meshing with the worm gear 19. This worm is provided with a flexible-shaft 26, which is operated, as will be hereinafter more fully described and by means of which the worm gear 19 is rotated, and by means of which the rod 24 is raised or lowered for the purpose hereinafter more fully described. The said rod is provided with a longitudinally extending groove 27, into which extends a locking pin 28, which is operated by the transverse pin 29, which extends out beyond the housing 10 and enters a recess 30 carried by the axle or by the stationary plate 2, whereby the housing 10 is locked in the position shown in Fig. 1, and the operation of this lock will be hereinafter more fully described in giving the full operation of the device. The pin 29 is held in its inward position by means of the spring 29' of Fig. 2.

The lower end of the screw-rod 24 is provided with a fork 31, in which is mounted the wheel 32, by means of the pintle or axle 33, which is rigidly mounted in the lower end of the fork. The said wheel is formed of a hollow form with one side cut away, as indicated at 34, and is provided with a solid rubber tire 35. The inner periphery of the rim of the wheel is provided with gear teeth 36, with which meshes the pinion 37. This pinion 37 is mounted in a frame or plate 37', carried by the fork 31, and is driven by means of the flexible shaft 38, which is driven by the same means as the shaft 26, and which will be later described. The shafts 26 and 38 extend to the gear case 39 mounted at any desired place on the automobile, and said case carrying the proper gearing to drive the shafts 26 and 38 at the proper time and which is driven by means of the engine driving the machine or driven directly by an auxiliary motor of any character. The shaft 26 enters the gear case 39 and has loosely mounted thereon within the same, a gear 40 adjacent one end of the casing, and a gear 41 adjacent the opposite end. The shaft 38 also enters the casing 39 and is provided with two loose gears 42 and 43, meshing with the gears 40 and 41. Entering the lower end of the casing 39 is a shaft 44 carrying a gear 45, meshing with gears 42 and 43, and continuously driving the same and the gears 40 and 41 meshing with the gears 42 and 43 are likewise continuously rotated. The gears 40 and 41, as heretofore stated, are loosely mounted upon the shaft 26, and between said gears and key upon the shaft is a doubled face friction gear 46, having beveled faces 47 and 48 engaging the beveled walls of the recesses 49 and 50 of the gears 40 and 41. The distance between the beveled faces 47 and 48 of the gear 47 is less than the distance between the beveled walls of the recesses 49 and 50, whereby the said gear can only frictionally engage one of the gears 40 and 41 at a time. The gear 46 is provided with a central annular recess 51, into which the reverse lever passes, as will be later described. The gear 46 has a longitudinal opening 52 therethrough and through which loosely passes the screw-threaded rod 53, and mounted on said rod is a screw-nut 54 having its outer periphery in the form of a star-wheel. Passing through the casing 39 is a screw 55, which is adapted to engage the star-wheel and turn it one point during each revolution of the gear 46 by the shaft 26. This operation causes the rod 53 to travel within the opening in the gear and engage the wall of the recesses carried by the gears 40 and 41 and causes the gear to disengage the gears 42 and 43, for stopping the rotation of the shaft 26, and whereby the shaft is driven a predetermined number of rotations in each direction. The shaft is also provided with a double faced gear 56, having beveled engaging faces 57 and 58, adapted to engage the beveled faces of the recesses 58' and 60 of the gears 42 and 43, and said gear is of a length less than the distance between the recess so that both beveled faces of the gears 42 and 43 cannot be in engagement at the same time. The gear 56 is provided with an annular groove 61 for the reverse or control lever 62, which I will now proceed to describe. This control lever 62 is pivoted at 63 to the outside of the casing and slidably mounted on said casing are blocks 64 and 65, which have recesses 66 and 67 into which the lever is adapted to pass. The said blocks having studs extending through slots in the casing and carrying bifurcated arms 68, and 69, which are adapted to fit into the annular grooves carried by the gears 46 and 56, whereby they may be moved into engagement with the gears for driving the shafts 26 and 38, as will be hereinafter fully described. The forked lever 31, of the rod 24, is provided with a hook 31', which is adapted to hook over a pin 32', carried by the axle, whereby the device is held in a horizontal position when not in use and the operation of which will be hereinafter more fully described.

The shaft 44 is driven from the engine driving the automobile or may be driven by an auxiliary engine of any character and is controlled by a lever located at any convenient point adjacent the driver's seat, whereby the gear 45 carried by the shaft 44 may be driven, as heretofore stated.

The operation of my device is as follows: The shaft 44 is set in operation by any means, as above stated, which in turn rotates the beveled gear 45 and sets in operation the gears 42, 43, 40 and 41. The doubled faced friction gear 46 being in the position shown in Fig. 4, the gear 41 drives the gear 46 which in turn rotates the shaft 26 and through the medium of the worm 25, the worm gear 19 causes the screw-threaded rod 24 to travel in the direction of the arrow, Fig. 2, to cause the hook 31' to disengage from the pin 32', carried by the rear face of the axle 1. After the hook 31' is disengaged from the pin 32', the teeth carried by the upper face of the worm-gear 19 engage the teeth 33' carried by the disk 13 and cause the housing 10 to swing downwardly around on the member 2. By the time the screw-rod 24 has reached a vertical position, the pin 28 has reached the end of the slot 27 and has caused the sliding member latch 29 to lock the same in a position to prevent the housing 10 from swinging in either direction. The continued rotation of the shaft 26 causes the screw rod 24 to force the wheel 32 against the ground and raise the forward wheels of the automobile from the ground. By the time this has taken place, the nut 54 by its engagement with the rod 55 has caused the screw-rod 53 to travel through the opening therein and engage the inner face of the recess in the gear 41 and to force the gear 42 to the left, so that the gear 46 will remain at a standstill. After this operation has taken place the lever 62 is moved in a direction to cause the friction gear 56 to engage either the gear 42 or 43 and thus lock the same to the shaft 38 through the gear 56. This locking of either of the gears 42 or 43 to the gear 56 causes the shaft 38 to rotate, and through the medium of the gear 37 and teeth 36 carried by the wheel 32 the same is rotated which swings the vehicle around as clearly shown in Fig. 3 of the drawing. This movement is either to the right or to the left by causing the gear 56 to mesh with either the gear 42 or 43.

The screw-rod 53 after the vehicle has been raised from the ground extends beyond the right hand end of the gear 46, thus it is impossible to throw the gear 46 to the right. The lever 62 is moved into engagement with the block carrying the bifurcated arm 69 and the gear 46 is moved to the left to engage the gear 40. This causes the shaft 26 to rotate in the opposite direction from that heretofore described. This operation causes the screw-rod 24 to be drawn upwardly until the lock pin 28 drops into the elongated groove 27 and the latch releases the housing 30. The continued rotation of the shaft 26, through the medium of the worm 19 and its teeth meshing with the gear 33, causes the housing to be drawn upwardly in a horizontal position. At the same time the screw-rod 24 is traveling upwardly. After the rod 24 has traveled up in a horizontal position and engages the pin 32', the gear 33' slips between the washers carried by the plate 2 and the rod 24 is drawn inwardly so that the hook 31' is over the pin 32. By the time this operation has taken place the screw-rod 53 through the nut 54 and the pin 55 has traveled to the left to engage the gear 40 and causing the friction gear 46 to travel to the right and the device is brought to a standstill. The shaft 44, after this operation, is stopped by means of the controlling lever, and the automobile is ready to travel in the ordinary manner.

Having thus described my invention, what I claim and desire to secure by Letters Patent is—

1. The combination with a vehicle, of a swinging and vertically movable wheel between the forward wheels of the vehicle, means for vertically moving the wheel downwardly for raising the forward end of the vehicle from the ground, automatic means for stopping the said vertically movable means, and means for rotating the said wheel.

2. The combination with a vehicle, of a swinging and horizontally and vertically movable wheel between the forward wheels of the vehicle, means for swinging said wheel in a vertical or horizontal position, automatic means for limiting the vertical and swinging movement of said wheel and means for rotating said wheel, substantially as shown and described.

3. The combination with a vehicle, of a wheel secured to the forward axle thereof and vertically and horizontally movable means for vertically and horizontally moving said wheel to raise the forward end of the vehicle from the ground, means for rotating said wheel and a single operating means for swinging and rotating the wheel.

4. The combination with a vehicle, of a plate secured to the forward end of the vehicle, a housing rotatably mounted on said plate, a wheel carried by the lower end of said housing and vertically movable therein, means for rotating said housing, and means for vertically moving the wheel in the housing and rotating the same.

5. The combination with a vehicle, of a plate secured to the forward end of the vehicle, a housing rotatable on said plate, a rod vertically movable in said housing, means for moving said rod in the housing, a wheel carried by the lower end of the said rod, means for rotating said wheel, and means for moving the rod upwardly within the housing and swinging the housing around in a horizontal position.

6. The combination with a vehicle, of a housing rotatably supported thereby, a rod vertically movable within the housing, a wheel carried by the lower end of said rod, means for vertically moving the rod within the housing and simultaneously oscillating the housing, a wheel carried by the lower end of the rod and means for rotating said wheel.

7. The combination of a vehicle, of a housing rotatably mounted on the forward end of the vehicle, a rod vertically movable in said housing, means for oscillating the housing and simultaneously moving the rod within the housing a pre-determined distance, a wheel carried by the lower end of the rod and means for operating said wheel.

8. The combination with a vehicle, of a housing rotatably mounted in the forward end of the vehicle, a rod vertically movable in the housing, means for oscillating the housing and simultaneously moving the rod in the housing, automatic means for controlling the movement of the housing and the rod, and wheel carried by the lower end of the rod and means for rotating said wheel.

9. The combination with a vehicle, of a housing rotatably mounted on the forward end of the vehicle, of a rod vertically movable in said housing, a worm gear for raising and lowering said rod in the housing, means carried by the worm for oscillating the housing on the vehicle, a wheel carried by the lower end of the rod and means for rotating said wheel.

10. The combination with a vehicle, of a housing rotatably mounted on the forward end of the vehicle, a rod vertically movable in said housing, a worm-gear surrounding the rod and having threads meshing with the threads of the rod, means for rotating the worm, whereby the rod is moved vertically within the housing, means carried by the worm for rotating the housing on the vehicle, automatic means for controlling the oscillating movement of the housing and also the vertical movement of the rod, a wheel carried by the lower end of the rod, and a gear meshing with the wheel and operating the wheel, substantially as shown and described.

11. The combination with a vehicle, of a housing rotatably mounted on the forward end of the vehicle, a catch adapted to lock the said housing in a vertical position, a rod passing through the housing, a worm-gear surrounding the rod within the housing and having the threads meshing with the threads on the rods, a worm rotating said worm-gear, teeth carried by the upper face of the worm-gear, and meshing with teeth carried by a frictionally held gear, a wheel carried by the lower end of the rod and means for rotating said wheel, substantially as shown and described.

12. The combination with the front axle of a vehicle, of a plate removably held thereon, a housing surrounding the plate, a vertically movable rod within the housing, means within the housing for oscillating the same and vertically moving the rod therein a predetermined distance, a wheel carried by the lower end of the rod, and means for rotating said wheel.

13. The combination with the front axle of a vehicle, of a plate removably secured thereto, a housing surrounding the plate, a rod vertically movable in the housing, means for moving the rod within the housing, a latch operated by the vertical movement of the rod for locking the housing in a vertical position, means operated by the rod operating means for oscillating the housing, a wheel carried by the lower end of the rod, and means for rotating said rod.

14. The combination with a vehicle having a front axle, of the I-beam form, a plate having a stud projecting within the channel of the I-beam and curved upper and lower faces, wedges having correspondingly curved faces to fit the same and having teeth on their outer faces to engage the flanges of the I-beam from wedging and gripping the I-beam axle, a housing carried by the plate and rotatable thereon, a vertically movable member within the housing, means for moving the member vertically within the housing and oscillating the same, a wheel carried by the lower end of said vertical movable member, and means for rotating said wheel in either direction.

15. The combination with a vehicle, of a housing rotatably mounted on the forward end of the vehicle, a vertically movable rod within the housing, means within the housing for oscillating the same and vertically moving the rod therein a predetermined distance, a wheel carried by the lower end of the rod, means for rotating said wheel in either direction, and automatic means for controlling the housing operating means.

16. The combination with a vehicle, of a housing rotatably mounted on the forward end of the vehicle, a vertically movable rod within the housing and carrying a wheel at its lower end, a gearing adjacent the housing, means driven by said gearing for vertically moving said rod and swinging the housing around, and automatic means carried by the gearing for reversing the direction of movement of the gearing for the purpose described.

17. The combination with a vehicle, of a vertically movable and horizontally pivoted wheel supported member carried by the forward end of the vehicle, a gearing adjacent said member, automatic means operated by the movement of the gearing for raising and lowering the said member, substantially as shown and described.

18. The combination with a vehicle, of a vertically movable and horizontally pivoted wheel carrying member supported by the forward end of the vehicle, a gearing adjacent the said member, automatic means operated by the gearing for reversing the direction of movement of the wheel supporting member, whereby the said member is moved automatically into and out of its operative position.

19. The combination with a vehicle, of a housing rotatably mounted on the forward end of the vehicle, a rod longitudinally movable within the said housing, a wheel carried by the lower end of the said rod, means for positively moving said rod longitudinally within the housing, frictional means for oscillating the housing, means for driving the wheel in either direction, and automatic means for reversing the direction of movement of the rod operating means.

20. The combination with a vehicle, of a wheel supported member horizontally pivoted and vertically movably supported by the vehicle, a gear case adjacent said wheel supported member, a shaft extending through said gear casing, two gears mounted on said shaft, a beveled gear positively turning said loosely mounted gears, a frictional gear between the loosely mounted gears and adapted to engage either of said loosely mounted gears, said frictional gear keyed upon the shaft, a rod loosely passing through the said frictional gear, a nut on said rod and having its outer periphery provided with teeth, a pin carried by the gear casing and engaging the teeth of said nut, whereby the rod travels through the frictional gear and engages the loosely mounted gears to disengage the frictional gear therefrom, whereby the shaft supporting the frictional gear is driven first in one direction and then the other, for raising and lowering the wheel supported member.

21. The combination with a vehicle, of a wheel supported member, horizontally pivoted and vertically and longitudinally movable, a gear case adjacent the said wheel supported member, two shafts loosely mounted in said gear case, one of said shafts adapted to rotate the wheel, the other shaft adapted to oscillate and longitudinally move the wheel supported member, two gears loosely mounted upon each shaft within the housing, a bevel gear for driving the two loosely mounted gears upon the lower shaft, said loosely mounted gears meshing with the loosely mounted gears of the upper shaft, automatic means for driving the upper shaft a predetermined number of rotations in one direction and automatically reversing the same and driving it the same number of rotations in the opposite direction, and a controlling lever for said gearing.

In testimony whereof I hereunto affix my signature in the presence of two witnesses.

MINARD A. POSSONS.

Witnesses:
F. T. BATCHELOR,
E. A. SCHNEIDER.